United States Patent

Barker

[11] Patent Number: 5,823,672
[45] Date of Patent: Oct. 20, 1998

[54] FOOD BLENDER WITH TWO BLADE ASSEMBLIES

[75] Inventor: Mario John Barker, Annandale, Australia

[73] Assignee: Breville Pty Ltd, New South Wales, Australia

[21] Appl. No.: 815,148

[22] Filed: Mar. 11, 1997

[30] Foreign Application Priority Data

Mar. 13, 1996 [AU] Australia ................................ PN 8643

[51] Int. Cl.⁶ .................................................. A47J 43/046
[52] U.S. Cl. ........................ 366/205; 366/314; 241/282.2
[58] Field of Search ................ 366/96–98, 197, 366/205, 314; 99/348; 241/282.1, 282.2

[56] References Cited

U.S. PATENT DOCUMENTS

| | | | |
|---|---|---|---|
| 2,278,125 | 3/1942 | Landgraf | 241/282.2 |
| 2,284,155 | 5/1942 | Langdgraf | 241/282.2 |
| 2,940,738 | 6/1960 | Posener et al. | 366/205 |
| 3,024,010 | 3/1962 | Sperling | 241/282.1 X |
| 3,139,917 | 7/1964 | Elmore | 366/205 X |
| 3,240,246 | 3/1966 | Dewenter | 241/282.1 X |
| 3,738,583 | 6/1973 | Berland et al. | 366/205 X |
| 3,856,220 | 12/1974 | Waters | 241/282.1 |

FOREIGN PATENT DOCUMENTS 574164 4/1959 Canada ................................ 241/282.2

*Primary Examiner*—Charles E. Cooley
*Attorney, Agent, or Firm*—Michael J. Striker

[57] ABSTRACT

A blender comprising a jar or jug having a wall, an inner surface of which extends substantially vertically except towards the lower end and which has on the inner surface a plurality of longitudinally extending circumferentially spaced ribs projecting from the wall towards the central axis of the jar or jug there being on a central vertical spindle near the bottom of the jar or jug a first rotating blade assembly having at its lower end a drive connection for an electric motor, the blade assembly consisting of a pair of blades projecting radially from the central axis, a second assembly of blades being mounted on the central spindle at a level higher than that of the first assembly, the second assembly consisting of a plurality of blades extending radially outwards from the central axis at about the same level but in different directions and at different angles to the central axis.

4 Claims, 3 Drawing Sheets

5,823,672

FOOD BLENDER WITH TWO BLADE ASSEMBLIES

BACKGROUND OF THE INVENTION

The present invention relates to a food blender of a kind consisting of a jar or jug usually of glass within which is mounted a rotating blade or blades at the bottom of the jar or jug. The food to be processed which may consist of portions of fruit or vegetables or even ice is placed in the jar or jug and the blades rotated rapidly to convert the food into a slurry or crush the ice finely.

Known food blenders have a number of shortcomings of which the following are significant a) when food is of a thick consistency and in a large volume it is unable to circulate within the blender jug b) food and ice tend to make an arch around the blades which results in the blades not having contact with the food or ice and therefore it is not processed and;

c) the center of the blades do not cut and as the vortex formed by rotation of the blades takes the food to the center of the blades the result is that large pieces food and ice are not processed.

SUMMARY OF THE INVENTION

The object of the present invention is to overcome these shortcomings and to provide a blender that will operate more effectively.

A blender according to the invention comprises a jar or jug having a wall, an inner surface of which extends substantially vertically except towards the lower end and which has on the inner surface a plurality of longitudinally extending circumferentially spaced ribs projecting from the wall towards a central axis of the jug or jar, there being on a central vertical spindle near the bottom of the jar or jug a first rotating blade assembly having at its lower end means for engaging a driving motor, the blade assembly consisting of a pair of blades projecting radially from the central axis at about the same level, one of said blades projecting horizontally and the other being directed downwardly at an angle, the outer end of the horizontally directed blade during, rotation of the assembly, passing close to the inwardly projecting ribs, a second assembly of blades being mounted on the central vertical spindle at a level higher than that of the first assembly, the second assembly consisting of a plurality of blades extending radially outwards from the central axis at about the same level but in different directions and at different angles to the central axis.

BRIEF DESCRIPTION OF THE DRAWINGS

In order that the nature of the invention may be better understood and put into practice a preferred form thereof is hereinafter described, by way of example, with reference to the accompanying drawings in which.

DESCRIPTION OF PREFERRED EMBODIMENTS

Figure 1:
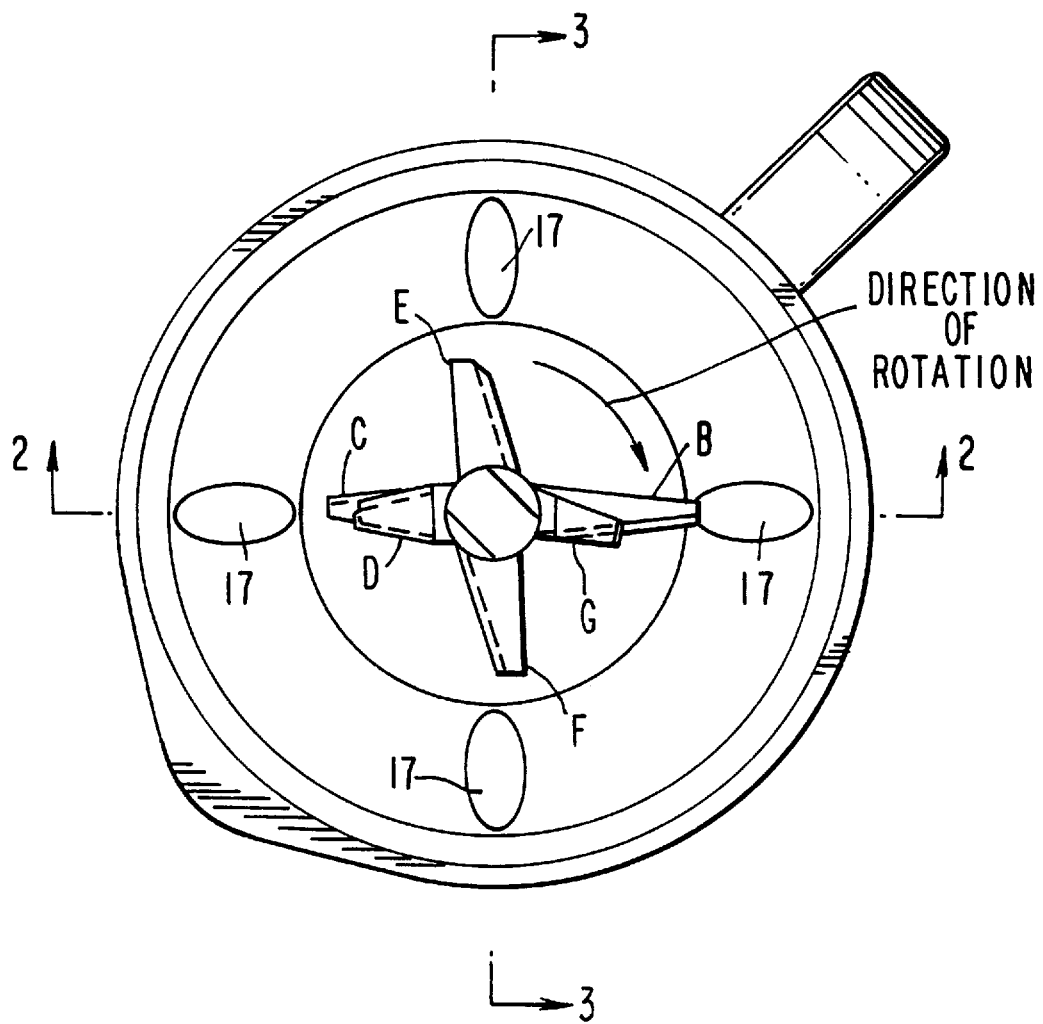
FIG. 1 is a plan view of the blender.
Figure 2:
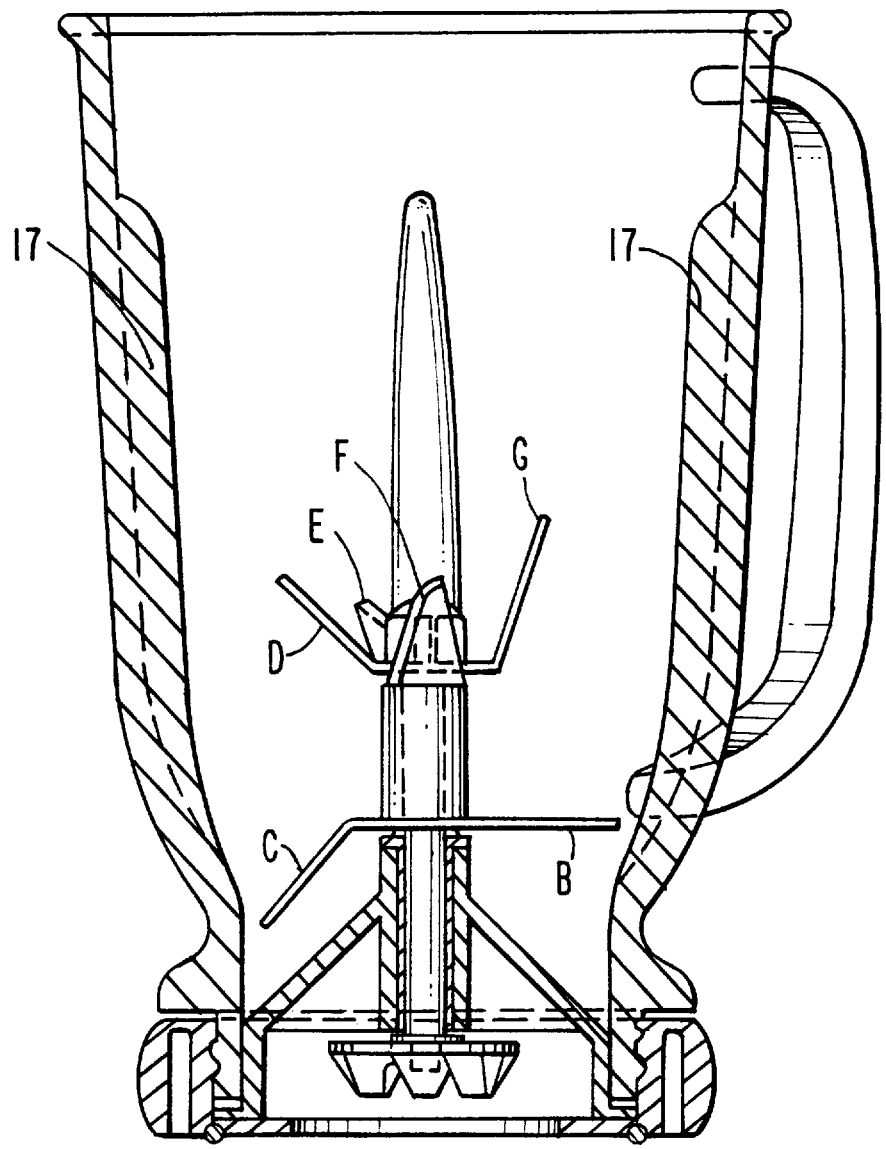
FIG. 2 is a vertical section on line 2—2 of FIG. 1.
Figure 3:
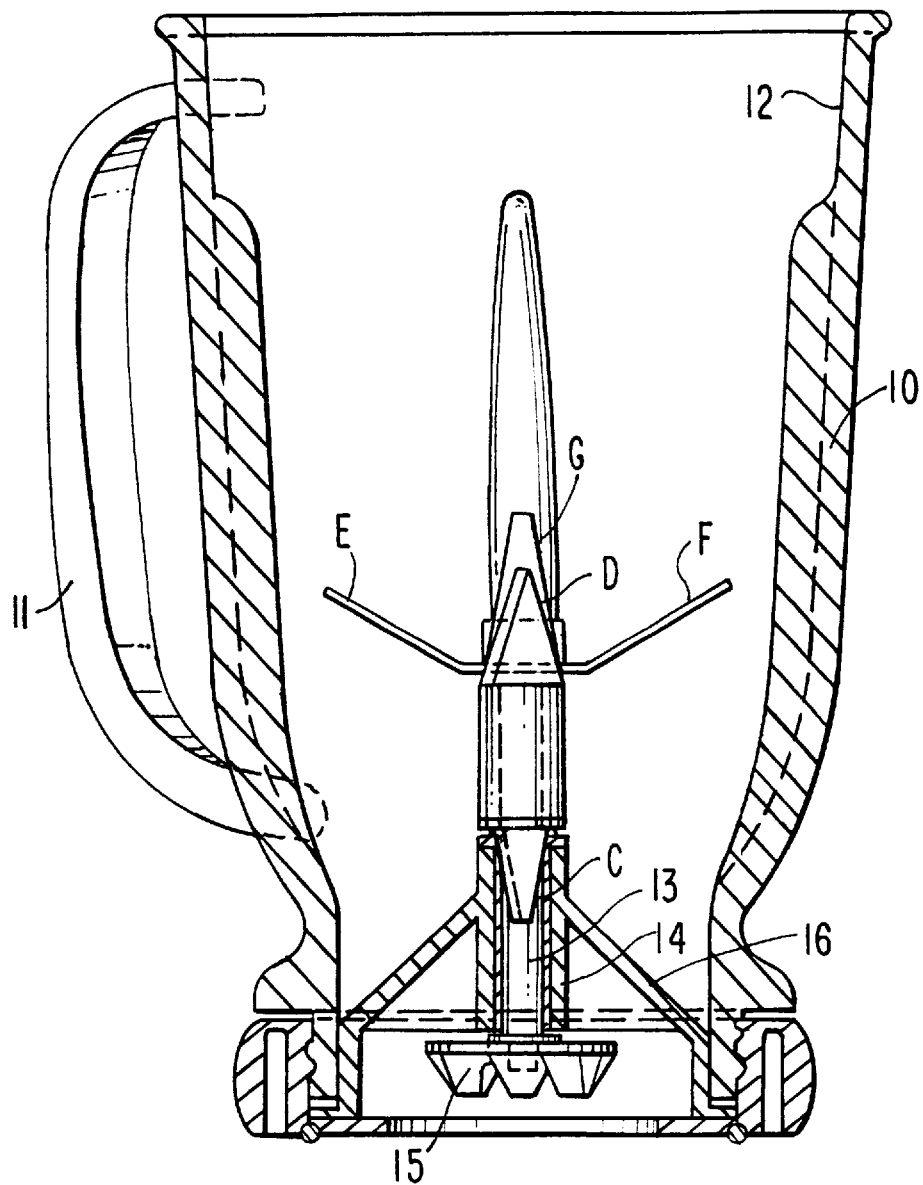
FIG. 3 is a vertical section on line 3—3 of FIG. 1.

The blender in its preferred form consists of a jug 10, made preferably of glass, having a handle 11. The inner wall 12 of the jug is more or less vertical in its upper part curving in towards its lower end.

Within the jug 10 on its vertical axis is a spindle 13 carried in a bearing 14 and having at its lower end a drive engaging means 15 whereby it may be connected to an electric driving motor arranged in a base on which the jug is normally placed. The spindle 13 carries on it two assemblies of blades, a lower assembly consisting of blades B and C and an upper assembly consisting of blades D, E, F, and G. The bearing 14 is carried by a conical structure 16 which not only supports the bearing 14 but which shapes the bottom of the jug in the manner described below.

The blade B of the lower assembly projects horizontally and passes very close to the ribs 17 formed on the inner wall of the jug 10. The other of the lower blades C is directed downwardly at an angle of 55 degrees from the axis about which it rotates and lies generally parallel to the surface of the conical structure 16.

The upper assembly of blades D, E, F and G is arranged near the middle of the jug as shown in the drawings from which it will be seen that the blades are of different lengths and arranged at different angles which in a preferred embodiment are at approximately 25, 35, 15, 75 degrees to the axis. The blades are so arranged so that there is a blade at each of a number of different angles to prevent there being any non-cutting point at which food and ice cannot be processed. The fact that this assembly of blades is substantially higher in the jug than the lower set causes the blending action of the blender to take place in the center of food or ice placed in it rather than the bottom. The lower assembly of blades does the final chopping and by reason of the fact that the blades are short enough to miss the ribs 17 during rotation, prevent food and ice forming an arch as normal blenders do by cutting the walls of the arch and collapsing them therefore processing food thoroughly.

The arrangement of ribs is to create an upward lift which forms a vortex back through the centre. Food and ice passing the lower blades tend to be crushed between them and the ribs.

It is important that there is a of space at the lower end of the blender jug such that food can circulate and be forced up the side of the jugs wall. The jug in the preferred form has an almost vertical side wall to give as much lift as possible. This is in contrast with the conventional blender that has a cone shaped jug in which the food goes through the center of the jug and cannot return back up the sides because the food will have to pass almost back up the center to reach the top to complete its journey so that a negative and equal reaction neutralises any movement.

The conical structure 16 provides a shape for the bottom of the jug the space in which is limited so that food or ice will be circulated rather than stay under the lower blades.

Optimum performance of the blender is obtained when the speed is correct. The blender may be operated preferably at a low speed of 1430 rpm or a high speed of 2000 rpm.

As an adjustment to the blender there may be provided an automatic ice crushing arrangement that consists of an auto pulse switch which switches on and off automatically. The motor driving the spindle 13 is switched on for 0.5 of a second which causes small portions of ice to be crushed and thrown to the top of the jug. To allow the ice to settle at the bottom of the jug and cover the blades motor is switched off for five seconds during which time the motor comes to a complete stop allowing the uncut ice to rest around the blades.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A blender, comprising a jar or jug having a central axis and a wall with an inner surface extending substantially vertically except toward a lower end; a plurality of longitudinally extending circumferentially spaced ribs arranged on said inner surface and projecting inwardly from said wall toward said central axis; a central vertical spindle located near a bottom of said jar or jug; a driving motor provided for driving said spindle; a first rotating blade assembly arranged on said central vertical spindle; said spindle having a lower end provided with means for engaging said driving motor, said blade assembly including a pair of blades projecting radially from said central axis at about a same level, one of said blades projecting horizontally and another of said blades being directed downwardly at an angle, said horizontally projecting blade having an outer end which during rotation of said assembly passes close to said ribs; a second assembly of blades mounted on said spindle at a level higher than that of said first assembly, said second assembly including a plurality of blades extending radially outwardly from said central axis at about a same level but in different directions and at different angles to said central axis.

2. A blender as defined in claim 1, and further comprising a conical structure provided in the bottom of said jar or jug to form a space such that food or ice is circulated rather than remaining under said first rotating blade assembly, said conical structure having an upper surface forming a same angle with said central axis as said downwardly directed blade of said first rotating blade assembly.

3. A blender as defined in claim 2, wherein said upper surface of said conical structure and said downwardly directed blade form an angle of about 55° with said central axis.

4. A blade as defined in claim 1, wherein said second assembly of blades has four blades which are spaced uniformly around said central axis and extend radially outwardly from said central axis, said blades of said second assembly being arranged in approximately 25, 35, 15 and 75 degrees to said central axis, said second assembly of blades being arranged near a middle of said jar or jug.

* * * * *